US012169806B2

(12) United States Patent
Chung et al.

(10) Patent No.: US 12,169,806 B2
(45) Date of Patent: Dec. 17, 2024

(54) NETWORK-BASED REAL-TIME ENTERPRISE TRAVEL MANAGEMENT APPARATUS, METHODS, AND SYSTEMS

(71) Applicant: U.S. Bank National Association, Minneapolis, MN (US)

(72) Inventors: Duke Chung, San Francisco, CA (US); Ching-Ho Fung, Kirkland, WA (US); Jon Morgan, San Francisco, CA (US); Joseph Williams, San Mateo, CA (US)

(73) Assignee: U.S. Bank National Association, Minneapolis, MN (US)

(*) Notice: Subject to any disclaimer, the term of this patent is extended or adjusted under 35 U.S.C. 154(b) by 546 days.

(21) Appl. No.: 15/691,662

(22) Filed: Aug. 30, 2017

(65) Prior Publication Data

US 2018/0075391 A1    Mar. 15, 2018

Related U.S. Application Data

(60) Provisional application No. 62/394,792, filed on Sep. 15, 2016.

(51) Int. Cl.
  *G06Q 10/0639* (2023.01)
  *G06Q 10/02* (2012.01)
  *G06Q 40/12* (2023.01)

(52) U.S. Cl.
  CPC ..... *G06Q 10/06393* (2013.01); *G06Q 10/025* (2013.01); *G06Q 40/125* (2013.12)

(58) Field of Classification Search
  CPC ...... G06Q 10/02; G06Q 10/10; G06Q 10/025; G06Q 50/14; G06Q 10/06311

USPC .............................................. 705/7.11–7.42
See application file for complete search history.

(56) References Cited

U.S. PATENT DOCUMENTS

| | | | |
|---|---|---|---|
| 7,720,702 B2 | 5/2010 | Fredericks et al. | |
| 7,974,892 B2 | 7/2011 | Fredericks et al. | |
| 8,117,073 B1 * | 2/2012 | Orttung | G06Q 30/0617 |
| | | | 705/26.43 |
| 8,140,361 B2 | 3/2012 | Fredericks et al. | |
| 8,620,750 B2 | 12/2013 | DePasquale et al. | |
| 8,712,811 B2 | 4/2014 | Fredericks et al. | |

(Continued)

FOREIGN PATENT DOCUMENTS

| | | |
|---|---|---|
| CN | 102542417 | 7/2012 |
| CN | 104471573 | 3/2015 |

OTHER PUBLICATIONS

G. Sedky, Hervé. "How to Get More Out of the Travel Budget without Increasing it." Business Travel News 28.11 (2011): 64 (Year: 2011).*

(Continued)

*Primary Examiner* — Amber A Misiaszek
(74) *Attorney, Agent, or Firm* — Merchant & Gould P.C.

(57) ABSTRACT

A system for expense management including an expense management apparatus. The expense management apparatus configured to receive, from a client device, at least one parameter associated with an event, construct at least one query based on the at least one parameter, transmit the at least one query to a database, receive, from the database, responsive data responding to the at least one query, construct a benchmark, using a processing arrangement, associated with the at least one parameter, and transmit the benchmark to the client device.

10 Claims, 6 Drawing Sheets

(56) References Cited

U.S. PATENT DOCUMENTS

| | | | |
|---|---|---|---|
| 8,861,861 B2 | 10/2014 | Barrett et al. | |
| 9,196,006 B2 | 11/2015 | Barrett et al. | |
| 9,286,601 B2 | 3/2016 | Elliott et al. | |
| 9,400,959 B2 | 7/2016 | Ollenberger et al. | |
| 9,665,888 B2 | 5/2017 | Depasquale et al. | |
| 9,691,037 B2 | 6/2017 | Elliott et al. | |
| 9,779,384 B2 | 10/2017 | Fredericks et al. | |
| 9,830,582 B1 | 11/2017 | Barrett | |
| 2002/0077871 A1* | 6/2002 | Udelhoven | G06Q 10/02 705/5 |
| 2003/0023463 A1* | 1/2003 | Dombroski | G06Q 10/02 705/5 |
| 2005/0192851 A1* | 9/2005 | Rangnekar | G06Q 10/02 705/5 |
| 2006/0212321 A1 | 9/2006 | Vance et al. | |
| 2006/0277079 A1* | 12/2006 | Gilligan | G06Q 10/025 705/6 |
| 2008/0167926 A1 | 7/2008 | Boss et al. | |
| 2008/0319808 A1* | 12/2008 | Wofford | G06Q 30/06 705/6 |
| 2011/0307280 A1* | 12/2011 | Mandelbaum | G06Q 10/025 705/6 |
| 2012/0150572 A1* | 6/2012 | Fredericks | G06Q 10/02 705/5 |
| 2013/0197948 A1 | 8/2013 | Fredericks et al. | |
| 2013/0227040 A1 | 8/2013 | Fredericks et al. | |
| 2014/0006067 A1 | 1/2014 | Rothley et al. | |
| 2014/0279268 A1 | 9/2014 | Muller et al. | |
| 2014/0288981 A1 | 9/2014 | Rajkarnikar et al. | |
| 2015/0154512 A1* | 6/2015 | Wenger | G06Q 10/02 705/5 |
| 2015/0269553 A1 | 9/2015 | Barrett | |
| 2015/0269560 A1 | 9/2015 | Barrett | |
| 2015/0269561 A1 | 9/2015 | Barrett | |
| 2016/0042471 A1 | 2/2016 | Barrett et al. | |
| 2016/0078560 A1 | 3/2016 | Farrell et al. | |
| 2016/0078561 A1 | 3/2016 | Farrell et al. | |
| 2016/0078562 A1 | 3/2016 | Farrell et al. | |
| 2016/0078563 A1 | 3/2016 | Farrell et al. | |
| 2016/0078564 A1 | 3/2016 | Farrell et al. | |
| 2016/0078565 A1 | 3/2016 | Farrell et al. | |
| 2016/0078566 A1 | 3/2016 | Farrell et al. | |
| 2016/0132977 A1 | 5/2016 | Fredericks et al. | |
| 2016/0239515 A1 | 8/2016 | Ollenberger et al. | |
| 2017/0109663 A1 | 4/2017 | Barrett et al. | |

OTHER PUBLICATIONS

Churchill, D. (Oct. 1999//, Oct. 1999). Taking a tough line. Director, 53, 80-94. Retrieved from https://dialog.proquest.com/professional/docview/219006115?accountid=131444 (Year: 1999).*

International Search Report Written PCT/US2017/051504, published Jan. 5, 2018.

Written Opinion of International Search Authority PCT/US2017/051504, published Jan. 5, 2018.

European Search Report in Application 17851505.2, mailed Jan. 21, 2020, 8 pages.

Chinese 1st Office Action and Search Report in Application 201780070438.9, mailed Nov. 15, 2022, 16 pages (with English translation).

Chinese 2nd Office Action in Application 201780070438.9, mailed Mar. 28, 2023, 29 pages, with English translation.

Zhao Jin-xiang, et al., Ed., "Theory and Method of Networked Hospital Health Economic Management", People's Military Medical Press, Nov. 30, 2005, Chapter 4 Materials Management of Networked Hospital, p. 76, 7 pages total with English translation.

Chinese Decision of Rejection in Application 201780070438.9, mailed May 22, 2023, 20 pages, with English translation.

Chen Gou-qiang et al., Ed., "Jingying Expressway Project Construction Information Management System", p. 55, Chapter II Project Information Management, with English translation, 5 pages (2007).

* cited by examiner

NETWORK-BASED REAL-TIME ENTERPRISE TRAVEL MANAGEMENT APPARATUS, METHODS, AND SYSTEMS

CROSS REFERENCE TO PRIOR APPLICATIONS

This application claims priority to U.S. Provisional Application Ser. No. 62/394,792, filed on Sep. 15, 2016, which is incorporated by reference herein in its entirety.

FIELD

Embodiments of the present invention are generally directed to a network-based real-time travel management system.

BACKGROUND

Business travel is typically a necessary and significant expense for many companies, both from the perspective of the business traveler and the organization. From the perspective of the business traveler, the process of booking and being reimbursed for business travel can be difficult and cumbersome. Additionally, restrictive and antiquated corporate booking policies and systems, including the processes and systems employed for reporting and submitting expenses, can further complicate and unnecessarily burden business travel.

From an organization's perspective, business travel can be expensive and difficult to budget and forecast. Travel expenses can vary widely depending on the destination, time-of-year of the travel, the amount of advance booking, and for no apparent reason at all. Forecasting travel expenses can be especially difficult for travel that is rarely taken and/or have unusual destinations. Further, even when business travelers are provided a budget, travelers are typically unaware of their expenses relative to the budget until the conclusion of their trip when they prepare an expense report for reimbursement of expenses. Moreover, many business travelers show significant disregard for expenses that are being reimbursed by a company, and may try to take advantage of business travel for their own reward (e.g., frequent flier programs, etc.). Additionally, many business travelers have increased expectations for nicer travel accommodations (e.g., first class/business class flights, luxury hotels, etc.) when on business travel, which can unnecessarily add to the expense of business travel.

SUMMARY

Exemplary embodiments of the present invention can provide a system for expense management including an expense management apparatus. The expense management apparatus can be configured to receive, from a client device, at least one parameter associated with an event, construct at least one query based on the at least one parameter, transmit the at least one query to a database, receive, from the database, responsive data responding to the at least one query, construct a benchmark, using a processing arrangement, associated with the at least one parameter, and transmit the benchmark to the client device.

According to certain exemplary embodiments, the event can include a travel booking. Further, the benchmark can include a budget, and the expense management apparatus can be further configured to receive, from the client device, at least one expense associated with the budget. The expense management apparatus can be further configured to provide a graphical representation of the at least one expense relative to the budget.

According to certain exemplary embodiments, the benchmark can be transmitted to a plurality of client devices. Further, the benchmark can include a budget, and the expense management apparatus can be further configured to receive, from the plurality of client devices, at least one expense associated with the budget, and the expense management apparatus can be further configured to provide a graphical representation of the at least one expense received from the plurality of client devices relative to the budget.

Another embodiment of the present invention can provide a system for travel management including a travel management apparatus. The travel management apparatus can be configured to receive, from a client device, at least one parameter associated with a user and an event, construct at least one query based on the at least one parameter, transmit the at least one query to a database, receive, from the database, responsive data responding to the at least one query, analyze, using a processing arrangement, historical data associated with the user, construct attribution preferences, using a processing arrangement, based on the historical data, apply, using a processing arrangement, the attribution preferences to the responsive data, and transmit, to the client device, a customized data set based on the analyzed responsive data.

According to certain exemplary embodiments, the event can include a travel booking. Further, analyzing the responsive data can include at least one of filtering and sorting, and the attribution preferences can include at least one of airline, time of day, number of stops, type of seat, type of plane, possibility of upgrade, on-board amenities, type of room, and airports. Additionally, application of the attribution preferences can include providing a weight of importance for each attribution preference, and each weight of importance can be correlated to a frequency for each attribution preference.

Yet another embodiment of the present invention can provide a system for travel management including a travel management apparatus. The travel management apparatus can be configured to receive, from a client device, at least one parameter associated with an event, construct at least one query based on the at least one parameter, transmit the at least one query to a database, receive, from the database, a plurality of responsive data responding to the at least one query, construct a benchmark associated with the at least one parameter, determine an incentive corresponding to at least one of the plurality of responsive data, and transmit the incentive to the client device.

According to certain exemplary embodiments, the event can include a travel booking. Further, each of the responsive data can include an associated incentive, and a value of each associated incentive can be inversely proportional to a cost associated with each of the responsive data. Additionally, the travel management apparatus can be further configured to graphically represent the incentive.

DETAILED DESCRIPTION

Embodiments of the present invention generally relate to a network-based real-time enterprise travel management system that can facilitate travel expense forecasting, budgeting, booking, and expense reporting, while simultaneously reducing the expenses incurred by incentivizing cost-effective travel. Although embodiments of the present invention are described with respect to systems and methods for managing enterprise travel, the systems and methods described herein are not limited thereto, and can be applicable to any event and/or expense management.

Figure 1:
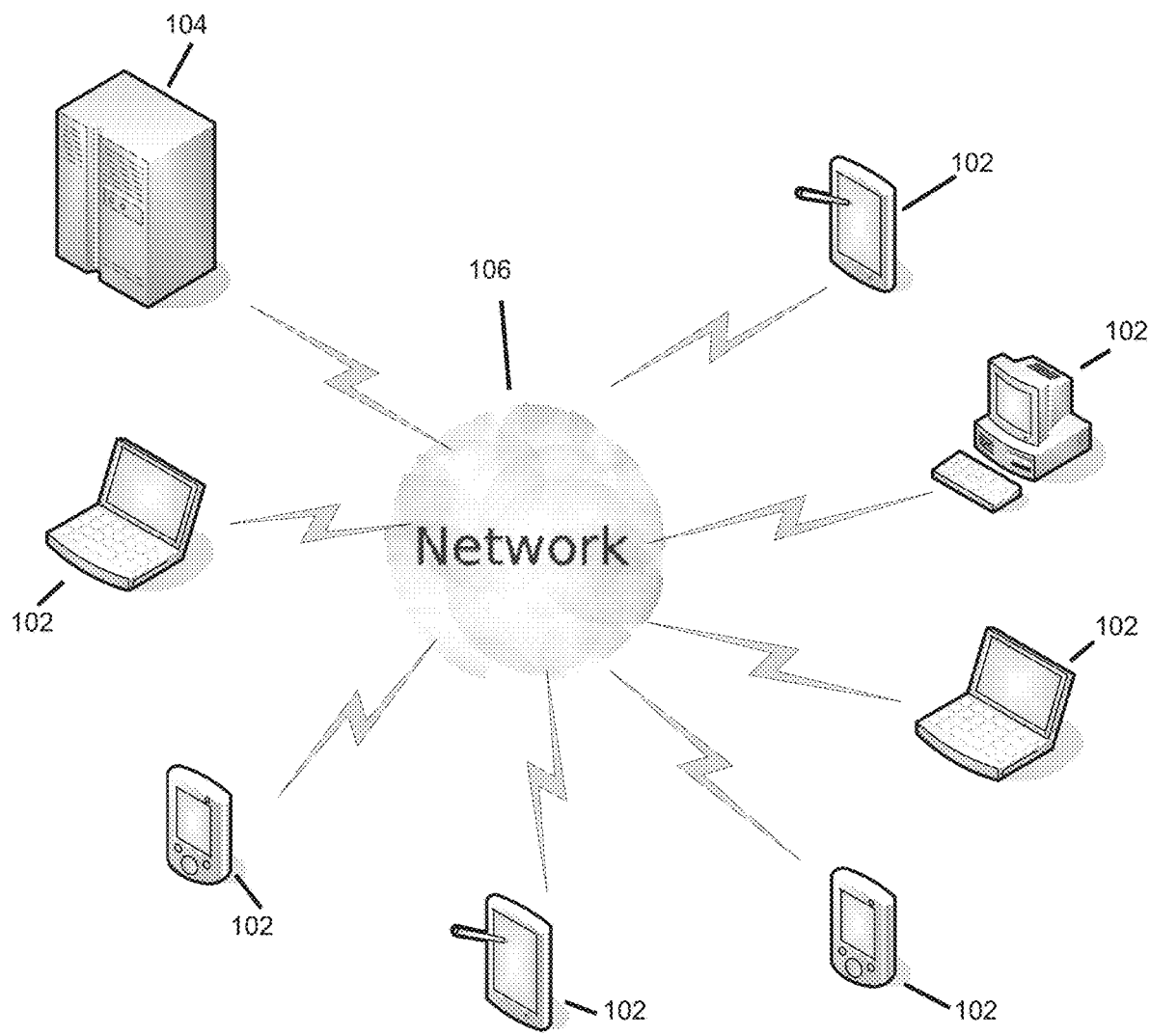
FIG. 1 is a block diagram of an exemplary system according to embodiments of the present invention.

FIG. 1 shows an exemplary real-time enterprise travel management system 100 according to an embodiment of the present invention. As shown in FIG. 1, exemplary system 100 can include one or more client devices 102 (e.g., smartphones, tablets, laptops, personal computers, etc.) communicating over a connected network 106 (e.g., wireless or wired) to one or more databases 104 (e.g., server, etc.) to enable real-time management of enterprise travel. Each client device 102 can include a mobile device executing an application (e.g., an app or a web-based application) that can enable data transmission and communication over network 106 between client devices 102 and at least one database 104. According to certain aspects of the present invention, the exemplary systems and methods can facilitate, for example: establishing a benchmark/forecast budget for a trip; automated real-time expense tracking and reporting; incentivizing cost-effective travel measures; and/or customizing travel itineraries to travel preferences.

For example, certain exemplary embodiments of the present invention can facilitate real-time benchmarking of anticipated travel. According to certain exemplary embodiments, a user can specify certain parameters of an upcoming trip. This can be done, for example, via a mobile or web-based application on any client device 102. For example, this may be similar to the user providing trip parameters as if the user were making travel arrangements. This can include, for example, dates of travel, destination, accommodations, transportation, meals, etc. Accordingly, a user can provide the parameters on an application on client 102. The parameters can be processed (e.g., locally or transmitted to a database via network 106), and based on the parameter information provided by the user, the exemplary system can construct custom queries and submit the queries to database(s) 104 via network 106 to obtain real-time pricing data in connection with the trip parameters specified by the user. Upon receipt of data responsive to the queries from database(s) 104 in response to the queries based on the user-provided parameters, the system can process the data to provide benchmark/forecast pricing data for the parameters provided by the user. For example, the real-time querying can include obtaining pricing data for all flight options (e.g., non-stop, single stop, multiple stops, time of day, etc.), all accommodation options (e.g., hotels of all ratings, motels, hostels, etc.), all transportation options (e.g., taxis, car service, rental car, public transportation, etc.), all food options, etc. The exemplary system can also optimize the real-time data obtained by the exemplary system. For example, the exemplary system can incorporate statistical analysis to optimize the data by, for example, filtering outlying data points. According to one exemplary embodiment, the exemplary system can, for example, employ variability statistics to identify data points that fall outside a defined range, and apply various criteria to the identified outlier data points to determine whether or not the identified outlier data points should be included in determining the benchmark/forecast data. For example, the defined range can be defined by the distribution of the data points (e.g., a multiple of the interquartile range, a multiple of a standard deviation, etc.) and the criteria used to determine inclusion can be based on relevant criteria for the type of travel and budget (e.g., travel time of flights, location of accommodations, etc.). The exemplary system can then use this data to construct and determine benchmark/forecast pricing data in connection with the specified trip based on the real-time pricing data. According to certain exemplary embodiments, the data can be processed to construct and determine benchmark/forecast pricing data at a remote database, which can then be transmitted via network 106 to client 102. Alternatively, the data can be transmitted via network 106 to client 102 and the processing of the data to construct and determine benchmark/forecast pricing data can be performed locally. The exemplary system can also incorporate and consider any corporate travel policies and requirements established by the organization (e.g., class of travel, cost of meals, class of accommodations, etc.). For example, filters can be automatically applied to the query data to eliminate options that are out of policy (e.g., eliminating first class airfare, eliminating five-star hotels, etc.). This benchmark/forecast pricing data can be then used to determine a budget (which can be approved by a manager or the organization) in connection with trip specified by the user.

As shown in FIG. 1, in determining the benchmark/forecast pricing data, each mobile client device 102 can include a mobile application. The mobile application can provide a user interface through which a user can, for example, provide the relevant information and parameters of the anticipated trip via the mobile application. This information can be transmitted by mobile client device 102 over network 106 to database 104. For example, database 104 can query other relevant databases (e.g., via application programming interfaces (APIs) of, for example, an online travel agency) to obtain data responsive to the queries in order to construct and determine benchmark/forecast pricing data based on the real-time pricing data, and transmit the benchmark/forecast pricing data back to the mobile application on mobile client device 102 via network 106. An organization can opt to employ the benchmark/forecast pricing data as the budget for the trip, or further modify the benchmark/forecast pricing data to establish a budget based on the benchmark/forecast pricing data.

Figure 2:
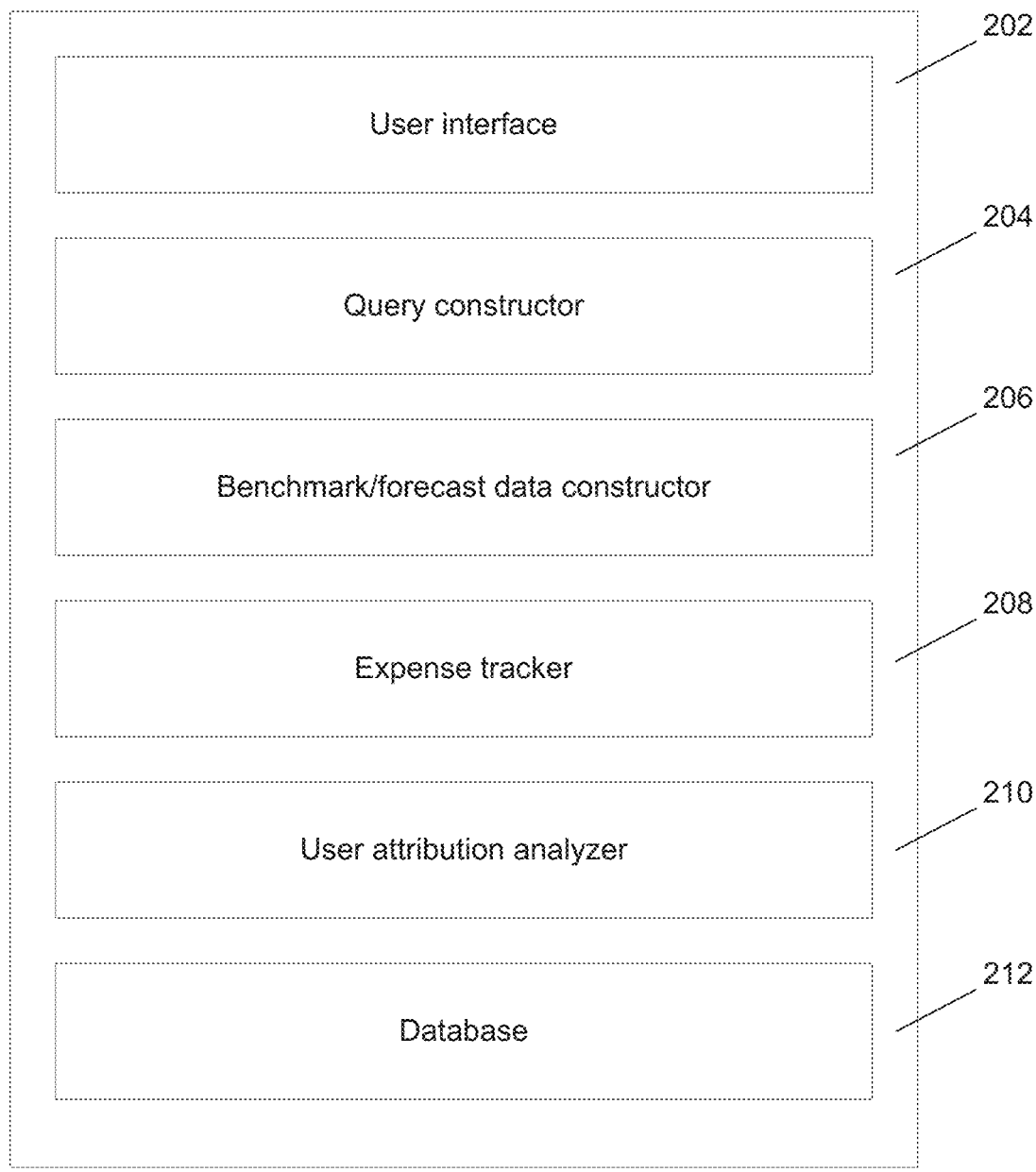
FIG. 2 is a block diagram of an exemplary travel management apparatus according to embodiments of the present invention.

FIG. 2 shows a block diagram of an exemplary travel expense management apparatus 200 according to embodiments of the present invention. As shown in FIG. 2, expense management apparatus 200 can include user interface 202 (e.g., a graphical user interface), query constructor 204, benchmark/forecast data constructor 206, expense tracker 208, and can be configured, for example, to be a mobile or web-based application that can be executed by a processor of a computing system such as client 102. For example, user interface 202 can allow a user of client 102 to provide the relevant trip parameters. Query constructor 204 can construct queries based on the parameters provided by the user, and benchmark/forecast data constructor 206 can construct and/or determine the benchmark/forecast pricing data based on the query results. Further, expense tracker 208 can provide real-time tracking of expenses, as further described herein. Additionally, travel expense management apparatus 200 can include an attribution analyzer 210 configured to analyze attribution data associated with each user to provide curated recommendations based on the user's history. According to certain embodiments, travel expense management apparatus 200 can also include database 212 to store various benchmark/forecast data, travel/booking history data, attribution data, real-time flight tracking data, flight exchange data, etc.

Figure 3:
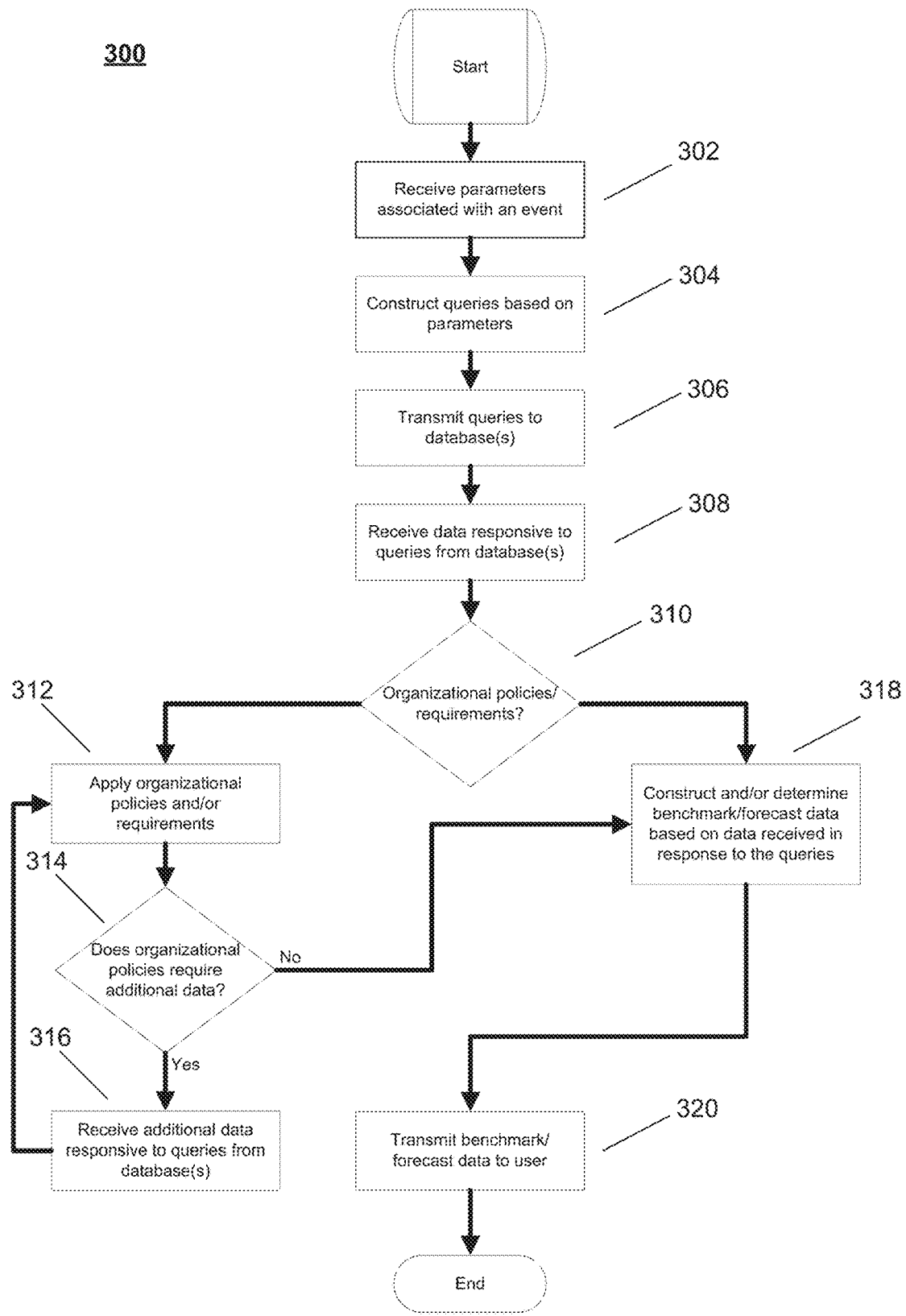
FIG. 3 is a flow chart of an exemplary method according to embodiments of the present invention.

FIG. 3 shows an exemplary flow diagram of an exemplary method 300 according to embodiments of the present invention. As shown in FIG. 3, in step 302, parameters associated with an event can be received from a user. This can include, for example, parameters such as dates for a trip, origin and destination, etc., and can be received via an application, such as an application (e.g., web-based application or a mobile app) on a device such as client 102. In step 304, custom queries can be constructed based on the parameters received in step 302. These queries can be created based on the parameters received in step 304 (e.g., dates of travel, origin and destination, etc.). Further, these queries can incorporate any policies an organization has in place (e.g., class of travel, accommodation star rating, etc.). In step 306, the constructed queries can be transmitted to the one or more databases (e.g., database 104). In step 308, data responsive to the queries can be received from the one or more databases. In step 310, the system can consider whether any organizational policies and/or requirements exist. If such policies and/or requirements exist, they can be applied in step 312. After the organizational policies are applied, in step 314, the exemplary method can confirm that sufficient data has been received in accordance with the organizational policies to construct and/or determine the benchmark/forecast data that fulfills the requirements of the organizational policies. If the organizational policies require additional data, additional data is received in step 316, and the exemplary method once again applies the organizational policies and confirms that sufficient data has been received to conform to the organizational policies. Obtaining additional data in step 316 can include, for example, constructing additional queries and/or accessing additional databases. Once it is determined that the data complies with the organizational policies, benchmark/forecast data can be constructed and/or determined in step 318. However, if no such organizational policies and/or requirements exist, then the benchmark/forecast data is constructed and/or determined in step 318 without applying any such organizational policies and/or requirements and checking the sufficiency of the data with respect to the organizational policies. In step 320, the benchmark/forecast data can be transmitted to the user (e.g., client 102).

In addition to real-time benchmarking of anticipated travel, certain embodiments of the present invention can enable benchmarking and/or budgeting for a party, event, outing, department, etc. For example, if a company were planning a party, reception, launch, happy hour, conference, etc., embodiments of the present invention can determine forecast benchmark/budget pricing data for any such event. Similarly, the exemplary system can perform queries of real-time pricing data in connection with the parameters specified in connection with the event. This can include, for example, the cost of venues, meals, drinks, entertainment, decorations, etc. The exemplary system can then, for example, determine benchmark/forecast pricing data based on the real-time pricing data. The exemplary system can also incorporate and consider any corporate policies and requirements established by the organization (e.g., cost of meals, type of venue, etc.). This benchmark/forecast pricing data can be then used as a budget, or be used to establish a budget, in connection with the event being planned.

Figure 4:
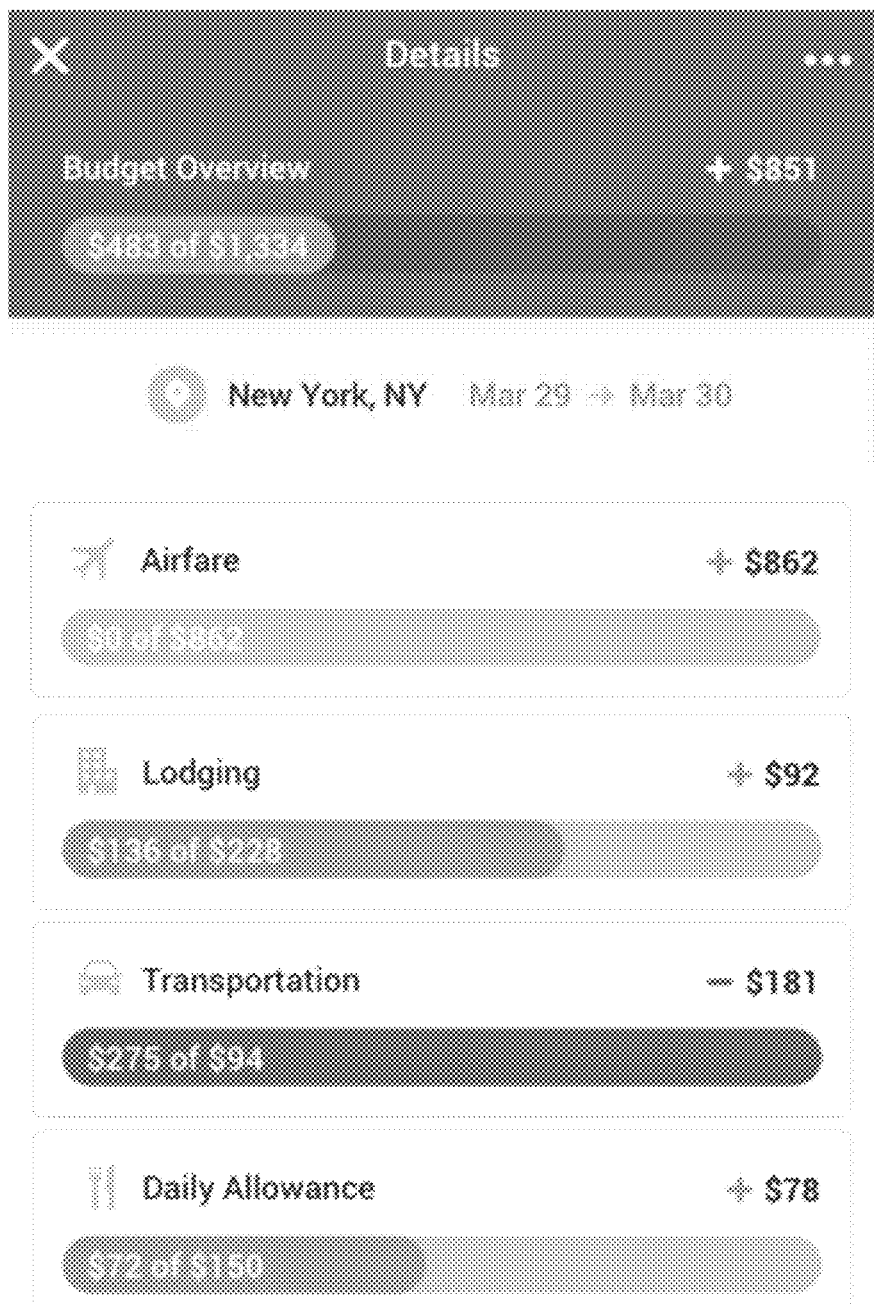
FIG. 4 is an exemplary screen shot according to embodiments of the present invention.

In addition to determining benchmark/forecast pricing data for a trip or event, exemplary embodiments of the present invention can also provide automated real-time expense tracking and reporting. For example, a user can track expenses incurred in connection with the trip or event in real-time. A user can provide expense information in real-time as expenses are being incurred (e.g., meals, airfare, etc.) via the application on client 102, which can then be tracked by the exemplary system. According to certain exemplary embodiments, the real-time expense tracking can be performed relative to a budget, such as the benchmark/forecast information that can be constructed and determined according to certain aspects of the present invention. For example, the mobile application can include a graphical user interface (GUI) that can graphically represent both the budget and the real-time tracking of the expenses being incurred in connection with a trip or an event. According to one aspect of the present invention, the GUI can provide a graphical bar, pie-chart, graph, or other graphical representation that shows the budget for the specific matter and the real-time expenses as a proportion of the total budget as the expenses are incurred in real-time. For instance, if a user has a budget of $100 and incurs a $20 expense, the graphical representation can depict the entire $100 budget, the $20 expense, and the remaining $80 in the budget. Optionally, each expense can be categorized and depicted individually (e.g., food/meals, lodging, transportation, etc.). The graphical representation can also provide one or more varying alerts (e.g., color changes, pop-ups, etc.) at predetermined thresholds of the total remaining budget (e.g., 10%, 15%, 20%, etc.) as the expenses are incurred in real-time and tracked against the budget. For example, the graphical representation can include a budget bar, which can correspond to a budget determined based on the benchmark/forecast pricing data. Then, as a user incurs and inputs expenses in real-time, the bar can turn yellow when only 15% of the budget remains, and can turn red once the user has reached and/or exceeded the budget, FIG. 4 shows an exemplary screenshot 400 of a graphical representation of the real-time expense tracking. As shown in FIG. 4, the exemplary system can provide a graphical representation of real-time tracking of expenses as they are incurred relative to the budget.

Optionally, exemplary embodiments of the present invention can also provide automated real-time price verification. For example, the exemplary system can continuously query real-time pricing information even the benchmark/forecast data has been established, and provide notifications (e.g., push notifications, emails, text alerts, etc.) if it detects a change in pricing data associated with the previously submitted queries. This can allow for real-time updating of the benchmark/forecast data even after a trip has begun. Alternatively, these real-time alerts can allow a user to realize additional savings by potentially re-booking the travel at the new reduced rates. According to certain embodiments, the exemplary system can consider cancellation and/or change policies of travel already booked and automatically re-book travel that would result in additional savings in view of the cancellation and/or change policies.

According to certain exemplary embodiments, each user activated on the exemplary expense management system can have a corresponding account, and the user can input expenses to the exemplary through a variety of different channels. For example, the user can input the information manually, via an image capture of a document such as a receipt and having the system parse the text using, for example, optical character recognition (OCR), by emailing or uploading a document such as an e-receipt, or by linking various payment/financial service and systems (e.g., a corporate credit card, credit card, PayPal, automated clearing house (ACH), other payment service, etc.) to his/her account and having the transaction information be automatically ingested and synchronized.

Additionally, the exemplary system can automatically compile all the expenses that have been input in real-time and automatically generate an expense report that can be automatically submitted to the organization for reimbursement. The exemplary system can also interface with accounting and payment systems with the organization to facilitate automatic and/or real-time reimbursement of the expense report. For example, the exemplary system can interface various payment/financial service and systems (e.g., a PayPal, ACH, Venmo or other peer-to-peer payment systems, etc.). The exemplary system can also employ machine-learning to further simplify and automate expense report generation and submission. For example, the exemplary system can analyze past historical data input to and captured by the system to identify mappings, trends, relationships, pairings, etc. to automatically categorize expenses. Accordingly, the exemplary system can automatically classify expenses for specific expenses (e.g., for specific vendors) as they are incurred based on past expense report classifications and/or financial system information. For example, if a user inputs an expense from a McDonald's, the system can analyze past historical expense data to identify previous expenses associated with McDonald's. The system can then identify and analyze the classifications (e.g., such as a food or meal expense) associated with the previous expenses associated with McDonald's and can automatically categorize the expense accordingly (e.g., as a food or meal expense) based on the analysis of the previous classifications (e.g., which classification appears most often for a given vendor, etc.). Additionally, if the expense were charged to a credit card (or paid for using another financial system other than cash), the system can augment the automatic classification by incorporating data and coding information obtained from the credit card and/or the financial system (e.g., credit card coding for a restaurant, etc.) for the transaction.

The system can employ the machine learning on an individual, organizational, or a system level. For example, an individual's history can be analyzed to distill and determine individual preferences. Alternatively, an organization's data, policies, and classification categories can be utilized and applied, or the exemplary system can employ the machine learning on a system-wide basis such that the exemplary system would have access to a larger set of historical data. Optionally, the exemplary system can employ a hybrid system where certain aspects are performed on an organizational level (e.g., category definitions) and other aspects are performed on a system-wide basis (e.g., historical data).

According to certain exemplary embodiments of the present invention, the real-time expense tracking and reporting is not limited to an individual. For example, if a single budget is given to multiple people traveling together or collaboratively planning an event together, a group can be established and the real-time expense tracking can be performed across all the members of the group. For instance, a budget can be established based on the benchmark/forecast pricing data for a specific matter (e.g., outing, party, happy hour, conference, etc.), and as any member in the group incurs and inputs an expense in real-time in connection with that matter, the real-time expense can be reflected on the mobile applications of each of the group members. Accordingly, where the expense tracking is graphically represented as a budget bar, each expense incurred and input by each group member will appear on the budget bar of each group member, graphically representing the budget, the total expenses incurred, and the total remaining budget. This not only allows each member to track the budget, but creates visibility and accountability amongst the group members for the expenses that each member has incurred. Similarly, an expense report can be automatically compiled and submitted based on the incurred expenses of all group members at the conclusion of the project.

According to certain aspects, organizations can utilize the benchmark/forecast budgeting and real-time expense tracking to incentivize employees to reduce travel expenses. For example, organizations can offer rewards for staying under budget by offering employees a proportion of the amount the employee came in under budget. For example, if an employee was approved a budget of $1,000 for a trip and only expensed $500 on the trip, the organization may choose to reward the employee by providing him/her a proportion of the cost savings realized because of the employee's cost-effective travel. The employee may have realized savings by inconveniencing him/herself with inconvenient flights, asking a friend for accommodations, etc. The organization may then reward the employee by providing the employee a proportion (e.g., 10%, 20%, 50%, etc.) of the amount he/she was under budget to reward the reduction in travel expenses. The organization benefits by realizing a reduction in travel expenses, and the employee is rewarded and incentivized to stay under budget and reduce costs.

In addition to the user-focused functionality provided by the exemplary system, embodiments of the present invention can also provide managerial and/or organizational functionality. For example, the managerial functionality can include the ability to approve budgets based on benchmark/forecast pricing data, monitor real-time expense tracking (relative to approved budgets), monitor approve and process expense reports, etc.

Yet another embodiment of the present invention can provide an exemplary system and method for incentivizing cost-effective travel. For example, the exemplary system can include a travel booking engine and interface to enable direct booking of travel via the exemplary system. For instance, a user can directly book travel via the mobile application similar to any online travel agent. However, for each trip a user is looking to book, the exemplary system can determine baseline pricing data based on trip parameters in a manner similar to how benchmark/forecast pricing data is determined, as described herein. Based on the baseline pricing data, the exemplary system can determine rebate data associated with each travel option based on the price of each travel option relative to the baseline pricing data. For example, the rebate data can be offered as points, rewards, cryptocurrency (e.g., Bitcoin), monetary incentives, or other rebate system valid for future travel and/or services. Optionally, the exemplary system can provide a marketplace for exchanging or purchasing other goods or service with the accrued rebates (e.g., peer-to-peer, rebate sharing, etc.). Subsequently, each travel option can be presented graphically to the user with the associated rebate values associated with each travel option. According to certain exemplary embodiments, the rebate values can be inversely proportional to the cost of the travel option (i.e., a larger rebate can be associated with a lower cost travel option and a smaller rebate can be associated with a higher cost travel option). Accordingly, the user would likely be incentivized to select the lower cost travel option in order to obtain a greater rebate. Lower-cost travel options may include flights departing from alternate airports, having more stops, having less optimal departure and arrival times, etc. This would benefit both the organization (i.e., by realizing more cost-effective travel) and the user (i.e., by obtaining a larger rebate for future travel and/or services).

Yet another embodiment of the present invention can provide real-time and historical data analytics. For example, the exemplary system can analyze and leverage the data input to the system to provide real-time and historical analytics and recommendations, via, for example, virtual agents, etc. The data input to the system can include the data obtained from the benchmarking/forecast data, expense report generation and submission data, receipt image capturing, travel booking information, financial systems, etc. For instance, the exemplary system can leverage historical and real-time data to determine popular and trending vendors, providers, and establishments and provide recommendations on where to stay, where to find entertainment, how to get around (e.g., transportation options), where to eat, generally how much things cost, etc. The exemplary system can utilize the historical data to provide historical recommendations and can also analyze more recent and real-time data to identify recent trends to provide relevant real-time recommendations. As described herein, the exemplary system can employ all data input to the system (e.g., receipt image capture, benchmarking/forecast data, travel bookings, etc.) to provide even further granular data analytics such as specific dishes, entrees, appetizers, drinks, etc. are popular and frequently ordered at a specific establishment. These recommendations can be provided to a user while a user is performing a search or as a push notification to the mobile client of the user.

According to certain embodiments of the present invention, the data can be mined and analyzed to provide customized recommendations specific to each user. For example, the travel booking data can be analyzed for specific attributions to distill patterns and preferences for each given user. In addition to high-level attributions such as airline, hotel brand, car service, etc., the exemplary system can analyze data to determine more subtle attribution preferences based on things, such as, e.g., user type (e.g., corporate, solo, domain name, etc.), number/frequency of bookings for a particular airport, a particular aircraft, a particular airplane seat, a particular airplane seat for each particular aircraft type, possibility of an upgrade, seat pitch, size of plane, type of seat (e.g., lie-flat, recliner, etc.), on-board amenities (e.g., meals, WI-FI, on-board entertainment, etc.), possibility of colleagues on the flight/at the hotel, on-time percentage, number of stops and/or layover, length of layovers, credit cards, credit card reward programs, travel loyalty programs (e.g., frequent flier program, hotel loyalty program, etc.), time to travel to certain location, social media/peer/crowd-sourced recommendations and trends, a particular time of day to fly, a particular type of hotel room, a particular type of restaurant, a particular dish at restaurants, etc. Accordingly, the exemplary system can catalog a user's attribution preferences and provide filtered and/or sorted results and options based on the user's attribution preferences when the user is searching to book travel. For example, the exemplary system can prominently display preferred search results based on the user's preference attributions that best fit the user's preference attributions. Optionally, the exemplary system can also determine which attributions are more important to each individual user so as to provide difference weights of importance to the various attribution preferences in recommending certain booking options. Alternatively, the exemplary system can allow for the user to indicate which attribution preferences are more important. According to other aspects of the system, the exemplary system can catalogue a user's credit cards and can also consider the types of credit cards and the credit card rewards programs the user may have and provide recommendations with respect to which credit card should be used for each transaction to maximize the point earning potential.

Figure 5:
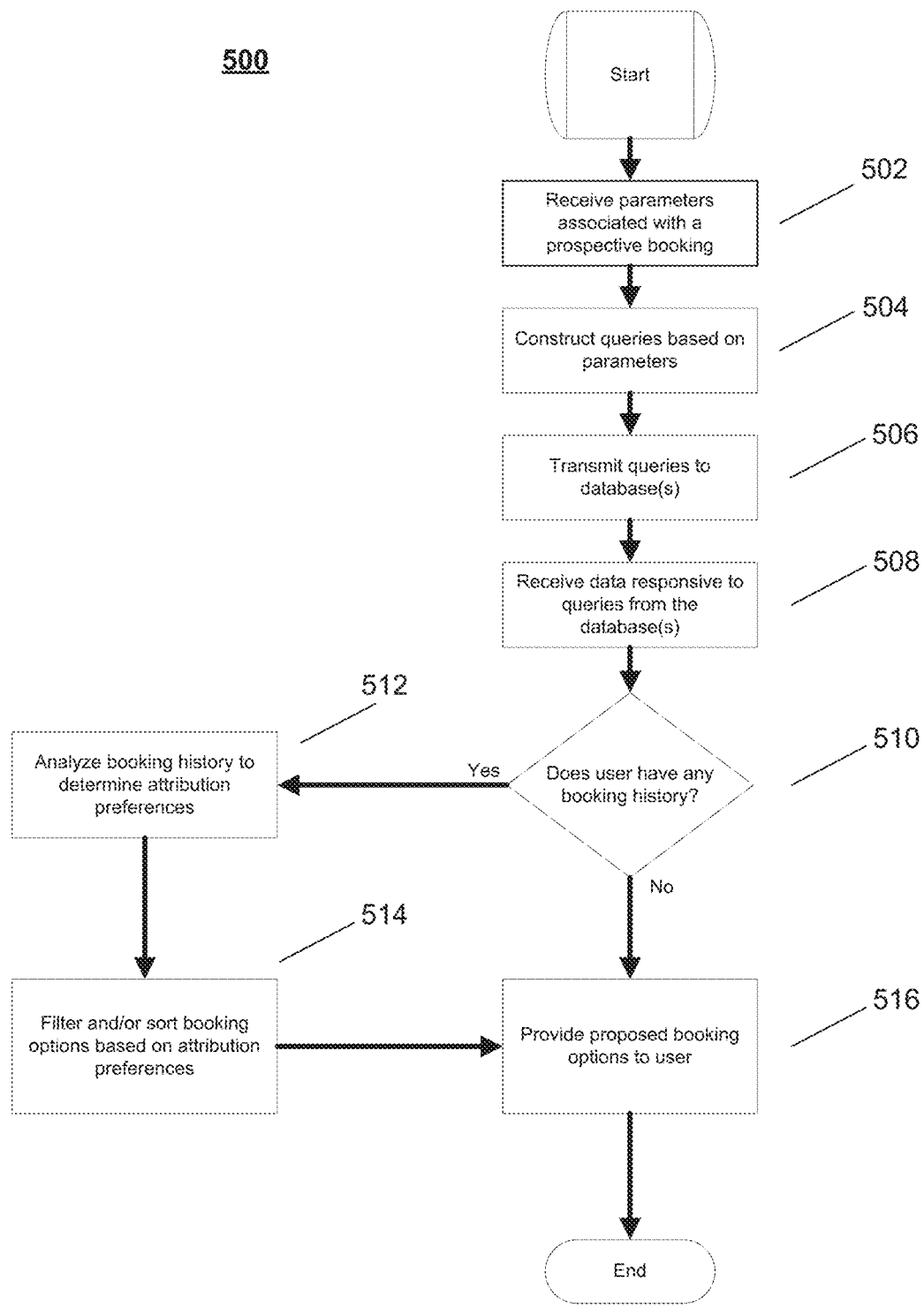
FIG. 5 is flow chart of an exemplary method according to embodiments of the present invention.

FIG. 5 shows an exemplary flow diagram of an exemplary method 500 according to embodiments of the present invention. As shown in FIG. 5, in step 502, parameters associated with a proposed booking can be received from a user. This can include, for example, parameters such as dates for a trip, origin and destination, etc., and can be received via an application, such as an application (e.g., web-based application or a mobile app) on a device such as client 102. In step 504, custom queries can be constructed based on the parameters received in step 502. These queries can be created based on the parameters received in step 504 (e.g., dates of travel, origin and destination, etc.). Further, these queries can incorporate any policies an organization has in place (e.g., class of travel, accommodation star rating, etc.). In step 506, the constructed queries can be transmitted to the one or more databases (e.g., database 104). In step 508, data responsive to the queries can be received from the one or more databases. In step 510, the system can consider whether any booking history associated with the user exists. If such booking history exists, they can be analyzed in step 512 to distill and determine a user's attribution preferences. After the booking history has been analyzed and a user's attribution preferences have been determined, the responsive query data is filtered and/or sorted based on the determined attribution preferences in step 514. Next, in step 516, proposed booking options are provided to the user (e.g., on client 102).

Yet another embodiment of the present invention can also provide a social networking aspect. For example, users within a common organization can be linked, and users within the organization can see which flights, hotels, restaurants, etc. their colleagues have booked, and allow for alignment of itineraries. According to certain aspects, the exemplary system can allow colleagues to see where their colleagues are seated on a plane (e.g., if flying on the same flight), where colleagues have stayed, where colleagues have eaten, where colleagues have hosted events, etc.

Figure 6:
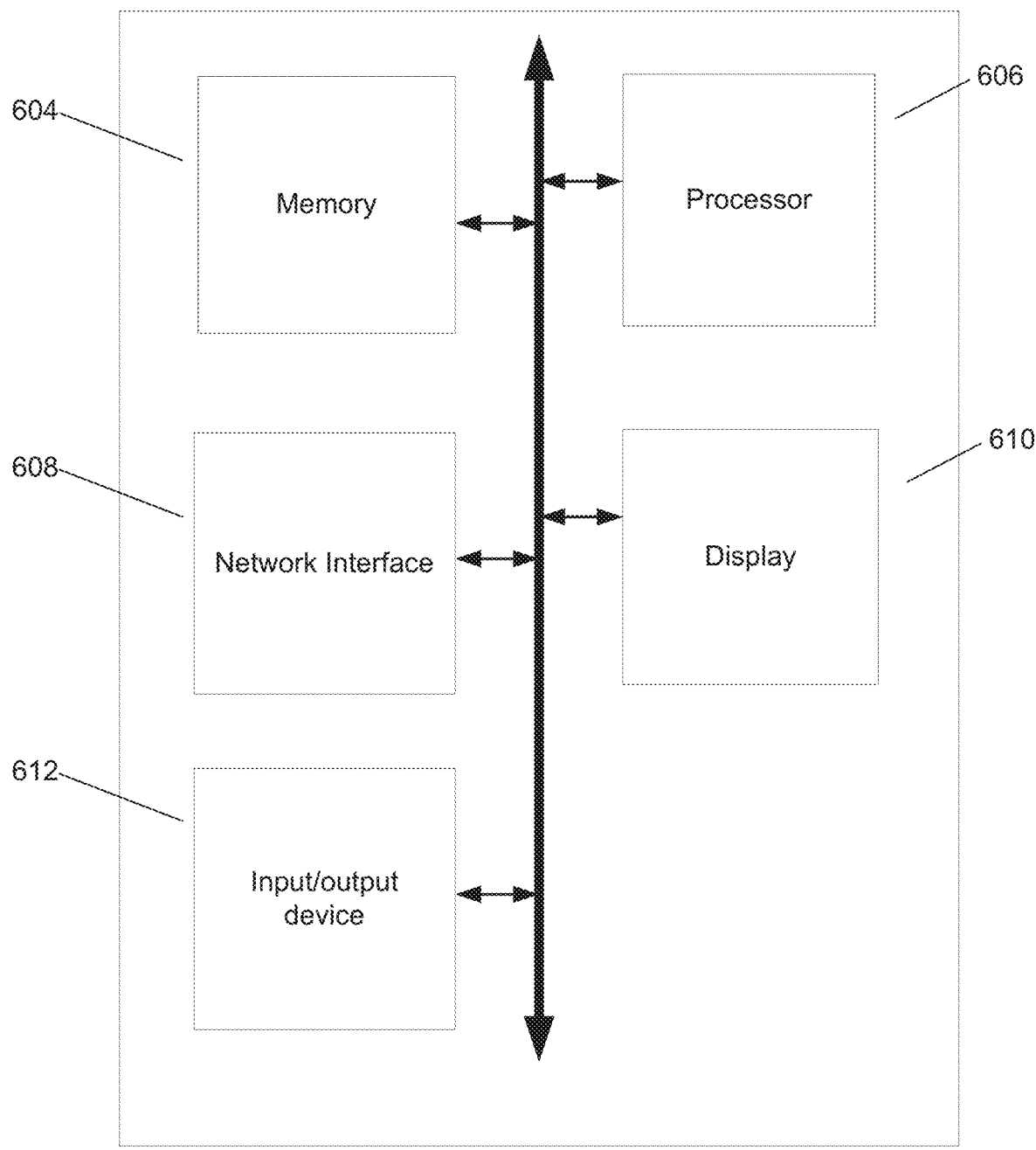
FIG. 6 is a block diagram of an exemplary system according to embodiments of the present invention.

FIG. 6 shows a block diagram of an exemplary processing arrangement 600 according to embodiments of the present invention, on which exemplary embodiments of the present invention may be implemented. As shown in FIG. 6, processing arrangement 600 can include memory 604, processor 606, network interface 608, display 610 and input/output device 612. Processing arrangement 600 may illustrate at least a portion of any systems, such as client device 102, a user may use in accordance with embodiments of the present invention. According to embodiments of the present invention, processing arrangement 600 can be configured and/or programmed to perform the exemplary methods described herein. For example, a mobile or web-based application can be stored in memory 604 and executed by processor 606. Further, network interface 608 can, for example, facilitate transmitting and receiving data (e.g., wirelessly or wired) via a network to database 104. Further, GUIs and graphical representations can be displayed on display 610 and input/output device 612 can be used by a user to input various parameters and provide certain information.

The embodiments and examples shown above are illustrative, and many variations can be introduced to them without departing from the spirit of the disclosure. For example, elements and/or features of different illustrative and exemplary embodiments herein may be combined with each other and/or substituted with each other within the scope of the disclosure. For a better understanding of the disclosure, reference should be had to any accompanying drawings and descriptive matter in which there is illustrated exemplary embodiments of the present invention.

What is claimed is:

1. A computing system for travel management, comprising:
   one or more processors;
   a network interface configured to transmit to a database and a client device via a network; and
   a memory storing program instructions that when executed by the one or more processors cause the one or more processors to at least:
      receive, from the client device over the network, at least one parameter associated with a user and an event;
      process the at least one parameter to construct at least one query based on the at least one parameter;
      transmit the at least one query to the database over the network;
      receive, from the database over the network and in real-time by continuously querying the database, a plurality of real-time pricing records responsive to the at least one query;
      receive an organizational policy including at least one organizational policy parameter;
      receive a plurality of historical data associated with the user;
      determine a plurality of attribution preferences based on the plurality of historical data;
      determine a statistical attribute associated with the plurality of real-time pricing records;
      remove at least one real-time pricing record from the plurality of real-time pricing records based on at least one of the at least one organizational policy parameter, the plurality of attribution preferences, or the statistical attribute to generate a revised plurality of real-time pricing records;
      subsequent to a removal of at least one of the plurality of records, provide the revised plurality of real-time pricing records for presentation on the client device;
      determine a budget benchmark based on the revised plurality of real-time pricing records;
      push a notification via a user interface on the client device, the notification being associated with the budget benchmark; and
      automatically detect a change in the plurality of real-time pricing records and push, via the user interface on the client device, an updated notification associated with an updated budget benchmark based on the change in the plurality of real-time pricing records.

2. The system of claim 1, wherein the event includes a travel booking.

3. The system of claim 2, wherein the plurality of attribution preferences includes at least one of airline, time of day, number of stops, type of seat, type of plane, possibility of upgrade, on-board amenities, type of room, and airports.

4. The system of claim 1, wherein a determination of the attribution preferences includes providing a weight of importance for each of the plurality of attribution preferences.

5. The system of claim 4, wherein each weight of importance is correlated to a frequency for each of the plurality of attribution preferences.

6. A computer implemented method, comprising:
   receiving, from a client device, at least one parameter associated with a travel booking;
   determining a plurality of real-time pricing travel records that are responsive to the at least one parameter by continuously querying one or more databases;
   determining a travel policy associated with the user;
   removing from consideration at least one real-time pricing travel record from the plurality of real-time pricing travel records based on the travel policy to generate a plurality of policy compliant pricing travel records from the plurality of real-time pricing travel records;
   subsequent to removing the at least one real-time pricing travel record, determining a budget for the travel booking based on the plurality of policy compliant pricing travel records;
   pushing one or more notifications to the client device via a user interface on the client device, the one or more notifications being associated with the budget and corresponding to any updates to the plurality of policy compliant pricing travel records;
   receiving an incurred expense associated with the budget;
   pushing a representation via the user interface on the client device, the representation being associated with the incurred expense relative to the budget; and
   providing the incurred expense to a further database other than the one or more databases to facilitate reimbursement of the incurred expense.

7. The computer implemented method of claim 6, further comprising:
   determining an incentive associated with the expense relative to the budget, wherein the incentive is directly proportional to a remaining budget.

8. The computing system of claim 1, wherein the program instructions further include instructions that, when executed by the one or more processors, cause the computing system to at least:
   determine a pricing range associated with the plurality of records and remove at least one record from the plurality of records having a pricing outside of the pricing range.

9. The computer implemented method of claim 6, wherein receipt of the incurred expense associated with the event includes:
   obtaining an image of a receipt associated with the incurred expense; and performing character recognition on the image of the receipt.

10. The computer implemented method of claim 6, wherein receipt of the incurred expense associated with the event includes:
   obtaining transaction information associated with the incurred expense from a third-party system.

* * * * *